United States Patent [19]
Östman

[11] Patent Number: 6,061,385
[45] Date of Patent: May 9, 2000

[54] METHOD AND A CIRCUIT ARRANGEMENT FOR SIGNAL PROCESSING IN A TELECOMMUNICATION SYSTEM

[75] Inventor: Kjell Östman, Salo, Finland

[73] Assignee: Nokia Mobile Phones Limited, Salo, Finland

[21] Appl. No.: 08/814,448

[22] Filed: Mar. 10, 1997

[30] Foreign Application Priority Data

Mar. 12, 1996 [FI] Finland .................................. 961143

[51] Int. Cl.$^7$ .............................. H04K 1/00; H04L 27/26
[52] U.S. Cl. ........................................... 375/130; 375/316
[58] Field of Search .................................. 375/316, 200, 375/206; 329/315, 316; 455/31.4, 34.1, 553

[56] References Cited

U.S. PATENT DOCUMENTS

| | | | |
|---|---|---|---|
| 5,291,474 | 3/1994 | Ikonen et al. ............................ | 370/30 |
| 5,301,367 | 4/1994 | Heinonen ................................. | 455/76 |
| 5,390,168 | 2/1995 | Vimpari .................................. | 370/30 |
| 5,469,115 | 11/1995 | Peterzell et al. ....................... | 330/129 |
| 5,471,652 | 11/1995 | Hulkko .................................... | 455/76 |
| 5,519,885 | 5/1996 | Vaisanen ................................. | 455/76 |
| 5,572,254 | 11/1996 | Kawahara ............................... | 348/222 |
| 5,786,782 | 7/1998 | Ostman et al. .......................... | 341/141 |
| 5,790,587 | 8/1998 | Smith et al. ............................ | 375/260 |
| 5,878,087 | 3/1999 | Ichihara ................................. | 375/316 |

FOREIGN PATENT DOCUMENTS

WO 92/2119  11/1996  WIPO .

*Primary Examiner*—Stephen Chin
*Assistant Examiner*—Abert C. Park
*Attorney, Agent, or Firm*—Perman & Green, LLP

[57] ABSTRACT

The object of the invention is a method and a circuit arrangement for processing a spread spectrum signal and a frequency modulated signal. According to the invention the radio frequency signal is received (1, 2), the received signal is converted into an intermediate frequency signal (3, 4a, 4b), and then an intermediate frequency signal processing (6, 30, 31, 40) is made and the processed intermediate frequency signals are converted (32, 42a, 42b) into baseband signals. The signal derived from the received signal is converted (41) into a digital sampled signal which is processed (32, 42a, 42b, 111, 120, 121) digitally, whereby the either a signal derived from the received spread spectrum signal or a signal derived from the received frequency modulated signal, respectively, is selected (5) as the signal which is converted to the digital sampled signal. According to the invention the same intermediate frequency and baseband components (6, 7, 30, 31, 40, 41) can be used to process both the spread spectrum signal and the frequency modulated signal.

11 Claims, 5 Drawing Sheets

METHOD AND A CIRCUIT ARRANGEMENT FOR SIGNAL PROCESSING IN A TELECOMMUNICATION SYSTEM

BACKGROUND OF THE INVENTION

The invention relates to a method and a circuit arrangement for processing a received spread spectrum signal and a received frequency modulated signal. The invention is preferably applied in mobile stations.

Mobile communication systems develop and grow very fast, so that in many regions systems according to several different standards have been constructed or are under construction. Therefore there is now a need for such mobile stations which can be used in more than one system. For instance, in the USA direct sequence spread spectrum (DSSS) systems will be built in addition to the systems based on frequency modulation (FM) technology now in use. Characteristics of receivers operating in these two system types are specified in the standard IS-95.

FIG. 1 shows a simplified block diagram of a typical prior art dual-mode transmitter/receiver 100. FIG. 1 shows in more detail only a part of the receiving branch of the transmitter/receiver, whereby the receiver 100 is a dual-mode receiver according to the standard IS-95. The receiver has direct sequence spread spectrum receiving circuits DSSS for a digital system, such as the code division multiple access system (CDMA), and the receiver further contains receiving circuits FM for an analog system, such as the advanced mobile phone system (AMPS). A radio frequency signal Rx received through the receiver antenna (not shown in FIG. 1) is filtered 101, amplified 102 and mixed to the intermediate frequency, so that an intermediate frequency signal IF at the frequency band 45 MHz is available at the output of the mixer 103. The intermediate frequency signal IF is supplied on one hand to the FM receiving branch and on the other hand to the spread spectrum receiving branch DSSS.

In the spread spectrum receiving branch DSSS the intermediate frequency signal IF is filtered 112 and mixed to the baseband with mixers 114a and 114b. A local oscillator signal LO is supplied to the mixer 114a, and a 90 degrees phase shifted 113 oscillator signal LOb is supplied to the mixer 114b, whereby a baseband signal of the in-phase branch I and a baseband signal of the quadrature branch Q are obtained as mixing results. The baseband signal obtained at the output of the mixer 114a, 114b is filtered 115a, 115b, amplified 116a, 116b and then supplied to an analog-to-digital converter 117a, 117b, which in this example is a 5-bit converter. The digital output signal of the converter 117a, 117b is supplied to the first input of a correlator 118a, 118b. A local spread spectrum generator 119 supplies to the second input of the correlator 118a, 118b a complex spreading sequence or PN (Pseudo Noise) sequence, with which the signal supplied to the first input of the correlator is multiplied. The output of the correlator is a digital signal i, q, containing the despread signal supplied to the first input.

The received signals i and q are supplied to the first input and the second input, respectively, of a digital signal processing block 120, and the output signal of the block 120 is further supplied to a CDMA mode speech signal processing block 121. When the receiver 100 operates in the CDMA mode the output signal D of the block 121 is supplied via a switch 122 to an digital-to-analog converter 123, which in this example is an 8-bit converter. The output signal Av of the converter 123 is supplied through possible filtering and amplifying circuits (not shown in FIG. 1) to the earpiece of the telephone for reproduction. The DSSS and CDMA systems will not be described in more detail here, because they are treated in numerous publications, of which we can mention [1] George Calhoun, digital Cellular Radio, 1988, and [2] the patent application publication WO 92/00639.

In the FM branch the first intermediate frequency signal IF at 45 MHz obtained from the output of the mixer 103 is supplied via the band-pass filter 104 to the mixer 105, in which the signal IF is mixed with the aid of a local oscillator signal generated by the local oscillator 106 to another intermediate frequency, typically 450 kHz. The second intermediate frequency signal is filtered 107 and amplified 108 and demodulated 109 to a baseband signal, after which the signal is supplied to an 8-bit analog-to-digital converter 110. The sampling rate of the converter 110 is 8 kHz, and the result of the conversion is a digitized signal which is supplied to the FM mode speech signal processing block 111, whose output signal F is supplied via the switch 122 and the digital-to-analog conversion 123 as an output signal Av, when the telephone operates in the FM mode.

FIG. 1 shows further a part of the transmit branch, in which the speech signal from the telephone's microphone is analog-to-digital converted 125. The result of the 8-bit conversion, the digitized speech signal, is supplied via the switch 124 either to the FM transmit branch TX-FM or to the DSSS transmit branch TX-DSSS. The transmit branches are not shown in greater detail here, because we assume that they are well known to a person skilled in the art.

In other words, when according to FIG. 1 the speech signal in the voiceband is processed digitally also in the analog operating mode, then the received signal F is converted to an analog signal with the digital-to-analog converter 123.

Correspondingly, the speech signal from the microphone is converted in the converter 125 to a digital signal Ra for digital signal processing. These D/A- and A/D-converters 123, 125 operating in the voiceband are typically common both to the digital spread spectrum operating mode and to the analog FM operating mode.

The major disadvantage of the presented solution is that the receiver has two parallel signal paths, or the paths FM and DSSS shown in FIG. 1, whereby the circuit requires a large number of components and correspondingly the manufacturing costs are high.

Another disadvantage is that the selective filtering of the digital mode requires complicated, expensive and high power consuming components. This is due to the fact that all filtering has to be done before the analog-to-digital conversion, because due to practical circuit arrangements the A/D-converters must use a limited dynamic range, or a relatively low number of bits (the 5-bit converters 117a, 117b in our example) because of the high sampling frequency used in these converters.

Moreover, a drawback of the prior art arrangement is that during the downconversion from the intermediate frequency to the baseband there may occur DC-offsets, and also as well an amplitude mismatch and a quadrature mismatch between the signals, whereby these inadequacies will have an adverse effect on the performance of the receiver.

SUMMARY OF THE INVENTION

Consequently, an objective of the invention is to provide a receiving method and a circuit arrangement, where both the analog and the digital operating mode uses the same signal path for the conversion of the intermediate frequency signal to a baseband signal. Thus the aim of the invention is specifically to use the same components for both operating modes. Another object of the invention is to provide a receiver architecture enabling the realization of a selectivity filtering, which can be manufactured with lower costs and which consumes less power, without increasing the complexity of the receiver structure. An object of the invention is further to provide a spread spectrum receiver, which does not possess the drawbacks caused by the above mentioned analog mixer components.

The method according to the invention is characterized in that either a signal derived from the spread spectrum signal or a signal derived from the frequency modulated signal is selected as the signal to be converted into the digital sampled signal.

The circuit arrangement according to the invention is characterized in that the circuit arrangement comprises a switching means arranged to switch, either a signal derived from the spread spectrum signal or a signal derived from the frequency modulated signal, to the input of said sampling means.

Preferred embodiments of the invention are presented in the dependent claims.

BRIEF DESCRIPTION OF THE DRAWING

The invention is described below in more detail with the aid of the enclosed drawings, in which.

DETAILED DESCRIPTION OF THE INVENTION

Figure 1:
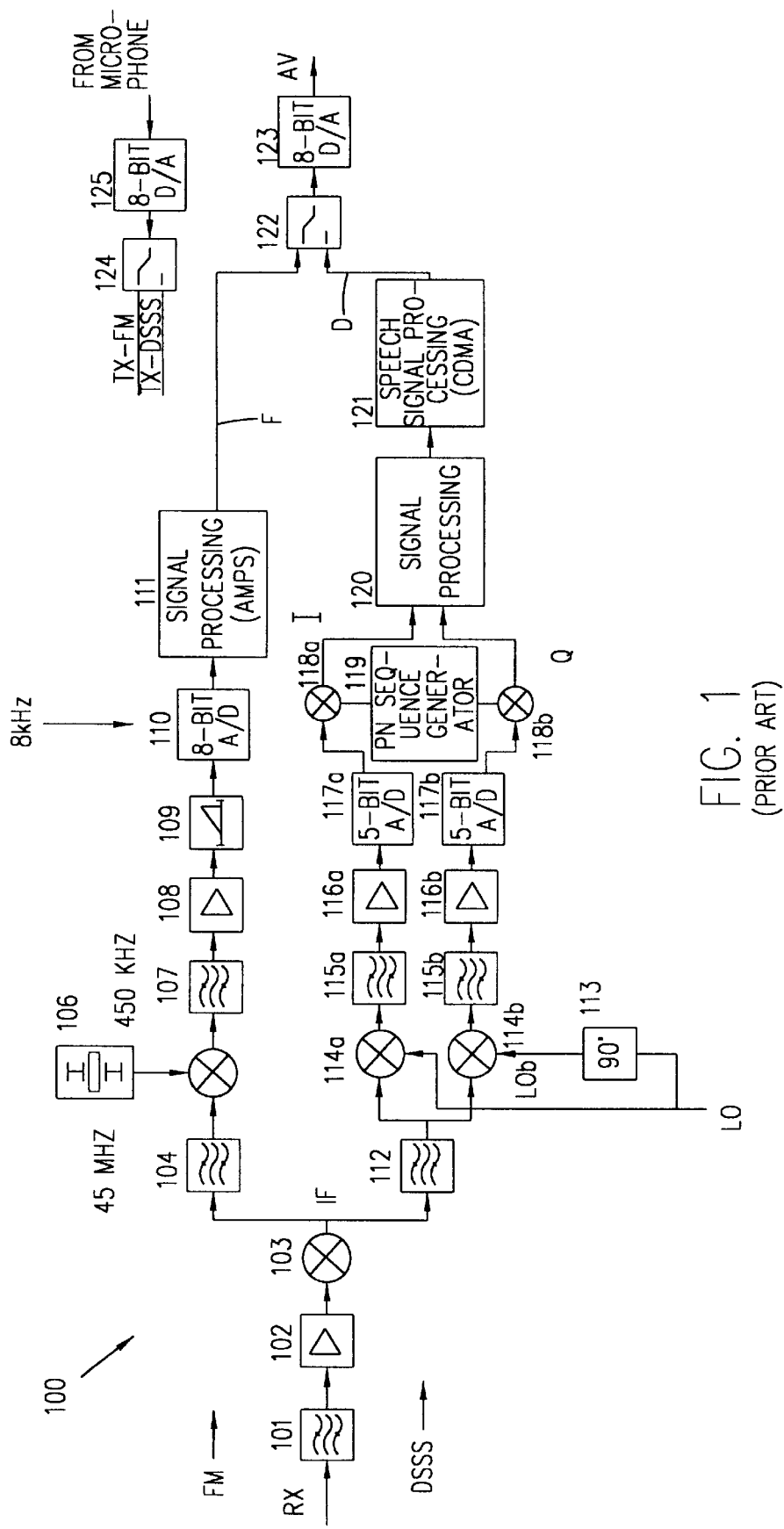
FIG. 1 shows a prior art circuit arrangement for the reception of a spread spectrum signal and a frequency modulated signal.

FIG. 1 was already explained above in connection with the description of prior art. Below we first describe the operating principle of the invention, and then we describe some preferred embodiments of the invention. The first embodiment of the invention is described with the aid of FIGS. 2 and 3, the second embodiment of the invention is described with the aid of FIG. 4, and the third embodiment of the invention is described with the aid of FIG. 5.

In a DSSS receiver the mixing of an intermediate frequency signal IF to the baseband means multiplying the received signal by two sinusoidal signals, having a 90 degrees phase offset, as is shown in FIG. 1 by the mixers 114a, 114b and the phase shifter 113. When in the prior art this is done with analog circuitry, there is usually an amplitude mismatch and a phase mismatch between the two forms of the local oscillator signal LO, the in-phase form LOa and the 90 degrees shifted form LOb, in other words, the phase shifter 113 in the case of FIG. 1 does not operate ideally, but slightly changes the amplitude of the signal LOb compared to the signal LOa, an it does not perform an exactly 90 degrees phase shift regarding the oscillator signal. The mixing can be made after the analog-to-digital conversion, whereby the local oscillator signals can be generated digitally, and thus they can be made to any convenient accuracy. Moreover, these local oscillator signals can always be replicated exactly, and they will not change due to temperature or component aging, as analog circuits tend to do. Additionally, this approach according to the invention requires the use of only one analog-to-digital converter instead of the two analog-to-digital converters 117a, 117b according to the prior art of FIG. 1.

In order to avoid aliasing due to sampling the sampling rate of the analog-to-digital converter must be sufficiently high, preferably at least twice the highest frequency contained in the received signal. On the other hand, a too high sampling rate leads to a very complicated converter, and it would also require a high supply power. In a typical solution according to the standard IS-95 the sampling rate is 9.8304 MHz, which as such is a quite high frequency regarding the technical realization. The sum of the frequency of the intermediate frequency signal IF and half of the bandwidth of the signal should not be higher than half of the sampling rate, or 4.915 MHz when the above mentioned sampling rate is used. According to the standard IS-95 the half bandwidth of the signal is 615 kHz, so that the intermediate frequency may be up to 4.3 MHz.

A digitally realized frequency conversion from the intermediate frequency to the baseband means that each signal sample is multiplied by a cosine and a sine value. To avoid complexity and extreme power consumption of the circuitry a well known method is to select the intermediate frequency to be a quarter of the sampling frequency, whereby in our example the intermediate frequency would be selected as 2.457 MHz (=¼ * 9.83 MHz). Then 2.457 MHz+615 kHz=3.072 MHz, which fulfills the above requirement. In this case the frequency conversion from the intermediate frequency to the baseband is a straightforward task, because it can be realized by multiplying the IF signals (I, Q) by the sequences {1,0,−1,0} and {0,−1,0,1}, respectively, whereby the result of the multiplication provides the signals R.

The downconversion to the baseband unavoidably will create an interfering spectrum at the frequency2 * IF. Typically this interfering spectrum is attenuated from the resulting baseband signal by digital filtering, which, however, can be a rather elaborate task, particularly if a high signal-to-interference ratio (SIR) is required of the receiver. In a digital receiver section according to IS-95 the required SIR is of the order of 6 to 10 dB after despreading the signal, i.e. the stopband attenuation of the filter has to be higher than 10 dB. According to the inventive solution, such a stopband attenuation is achieved by a simple low-pass filter having a transfer function H(z)=z+1, i.e. the filtering is made by summing two consecutive samples. Since every second sample after downconversion will be zero, the filtering can actually be made simply by doubling the non-zero samples:

$I(2n)=R(2n)$ and correspondingly $Q(2n)=-R(2n+1)$ $I(2n+1)=R(2n)Q(2n+1)=-R(2n+1)$ \hfill (A)

where n is the running number of the sample, R is the signal obtained after mixing, I is the in-phase signal component, and Q is the quadrature component.

The processing of the digital signals I, Q obtained after the above described downconversion and filtering will typically use only one sample per chip. Thus the filtering and downconversion can now be done by simply selecting one sample out of eight for the in-phase signal I, and by selecting and inverting the following sample for the quadrature signal Q.

After the downconversion and filtering the signal is despread by multiplying the complex signals I, Q by a complex PN sequence, and the resulting signals are then integrated over a predefined number of chips as follows:

$$Si(8n)=PNi(8n) * I(8n)+PNq(8n) * Q(8n),$$

and $$Sq(8n)=PNq(8n) * I(8n)+PNi(8n) * Q(8n), \quad (B)$$

where n is the running number of the signal, I and Q are the above mentioned in-phase and quadrature signals, PNi is the in-phase PN sequence and PNq the quadrature PN sequence, and Si, Sq are the corresponding signals resulting from the multiplication.

When the formulae (A) are put into the formulae (B) we obtain:

$$Si(8n)=PNi(8n) * R(8n)+PNq(8n) * R(8n+1),$$

and $$Sq(8n)=PNq(8n) * R(8n)+PNi(8n) * R(8n+1), \quad (C)$$

where R is again the signal sample supplied to the conversion.

Rather than inverting the multibit signal sample $R(8n+1)$ to form the quadrature signal, we now invert the single-bit quadrature PN sequence $PNq(8n)$.

Figure 2:
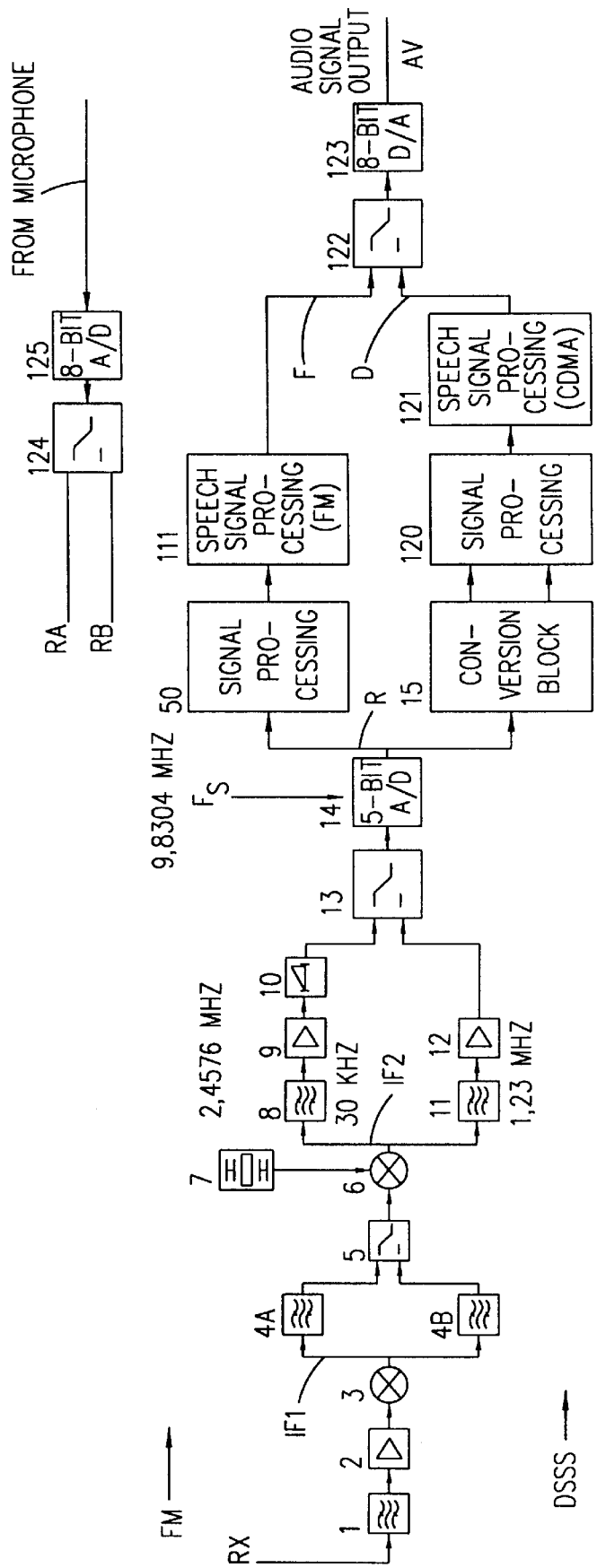
FIG. 2 shows in a block diagram a circuit arrangement according to the first embodiment of the invention for the reception of a spread spectrum signal and a frequency modulated signal.

FIG. 2 shows a block diagram of a receiver according to the invention. There the received signal Rx is mixed and filtered in several steps, and the resulting intermediate frequency signal IF is supplied to a 5-bit analog-to-digital conversion block 14. The sampling rate $f_s$ of the A/D-conversion is the above mentioned 9.8304 MHz, and the output of the block 14 is a digitized signal R, which regarding the DSSS signal is further supplied to the conversion block 15. The block diagram shown in FIG. 2 is described in more detail later.

Figure 3:
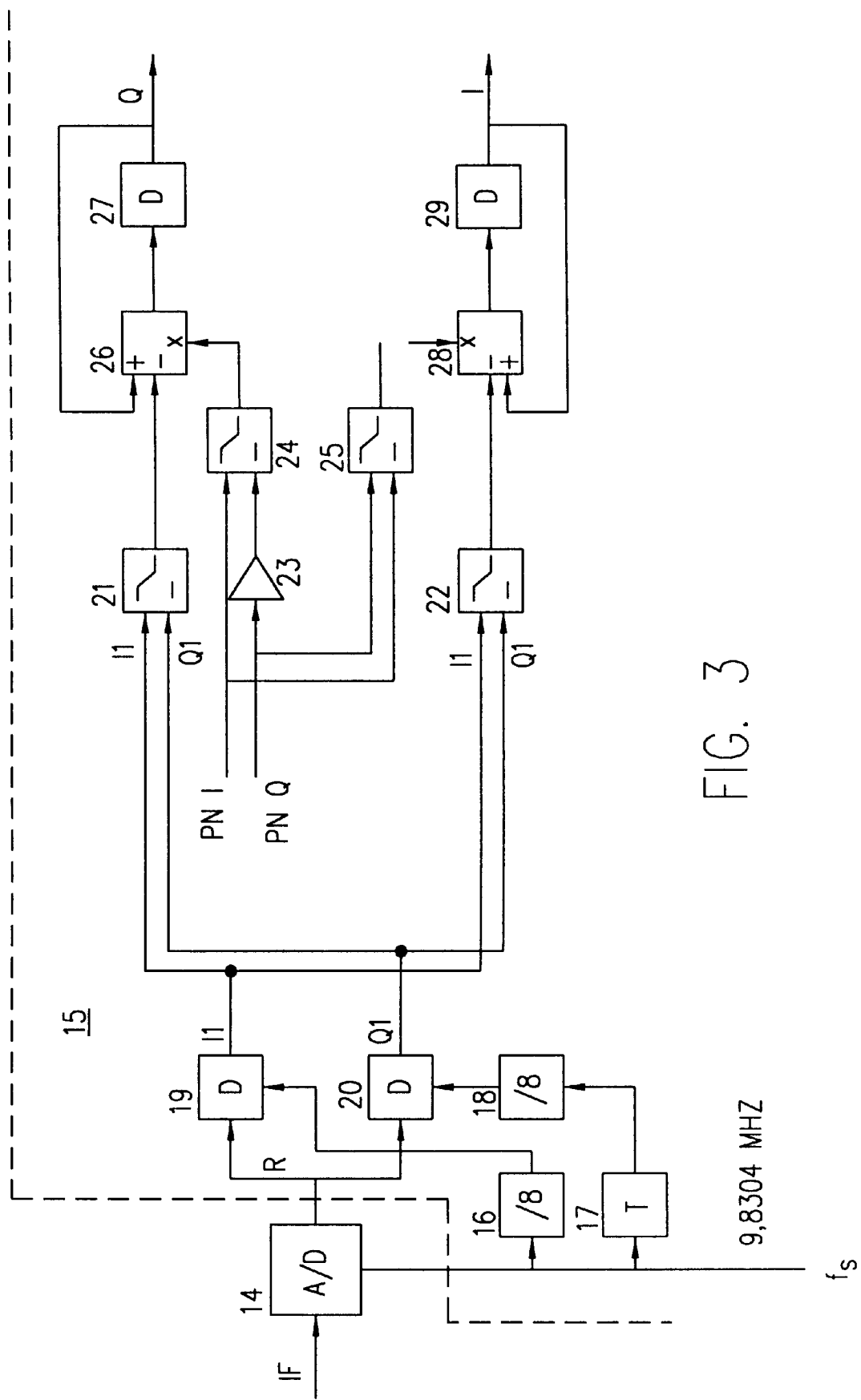
FIG. 3 shows in a block diagram the conversion block 15 of the circuit arrangement in FIG. 2.

FIG. 3 shows as a simplified block diagram an example of the structure of the conversion block 15, which is required in the receiving branch of a digital system's transmitter/receiver to perform the frequency downconversion, filtering and despreading of the signal according to the above formulae (C).

The digitized signal R is divided into two branches for the complex signal processing. First the operation according to the formulae (A) is realized by the circuits 19 and 20. Controlled by the divider 16 the circuit 19 takes every eighth sample from the input signal R, and the selected sample is kept as the input signal also during the next chip. Correspondingly, the circuit 20 takes every eighth sample from the input signal R controlled by the divider 18, however, so that the delay circuit 17 delays the control signal generated by the divider by one chip T compared to the control signal generated by the divider 16. The signal generated by the circuit 20 is also valid during the respective next chip (delay D). The selection and hold circuits 19, 20 have now as outputs the complex signals I1 and Q1, which are supplied to the two inputs of the selection circuit 21 and correspondingly to the two inputs of the selection circuit 22. The output (Rn+1) of the selection circuit 21 is supplied to the subtracting input of the circuit 26 and multiplied by the PN sequence ($-PNq(8n)$) obtained at the output of the selection circuit 24, and further, to this product is added the multiplication product ($=PNi(8n) * R(8n)$) of the previous chip. The output of the multiplication circuit is supplied to the delay circuit 27, whose output provides the component Q of the complex signal. The output signal Q of the circuit 27 is also supplied to the adding input of circuit 26. With the aid of the selection circuit 24 the circuit 26 receives during every second chip the signal PNi, and during alternating chips the signal –PNq, as stated above, whereby the negative sign is generated by the inverter 23. Correspondingly, the output (Rn+1) of the selection circuit 22 is supplied to the adding input of the circuit 28 and multiplied by the PN sequence ($PNi(8n)$) obtained at the output of the selection circuit 25, and further, from this product is subtracted the multiplication product ($=PNi(8n) * R(8n)$) of the previous chip. The output of the multiplication circuit is supplied to the delay circuit 29, whose output provides the component I of the complex signal. The output signal I of the circuit 29 is also supplied to the adding input of the circuit 28. With the aid of the selection circuit 25 the circuit 28 receives during every second chip the signal PNq, and during alternating chips the signal PNi.

FIG. 2 shows in a simplified block diagram the whole receiver section of a dual mode transmitter/receiver. Here, the same reference numerals are partly used to indicate the same components/circuits as in FIG. 1, whereby the description of their function is not repeated. A radio frequency signal Rx received by the receiver through the antenna (not shown) is filtered 1, amplified 2 and mixed to the intermediate frequency, so that an intermediate frequency signal IF1 at the frequency band 45 MHz is available at the output of the mixer 3.

The output of the mixer 3 is supplied to two different filters, the band-pass filter 4a for the FM signal and the band-pass filter 4b for the DSSS signal. The respective filtering products are supplied via the selector 5 to a second mixer 6, where the input signal is multiplied by a signal generated by the local oscillator 7, so that a second intermediate frequency signal IF2 at the frequency 2.46 MHz is obtained at the output of this mixer. In the case of FIG. 1 the second intermediate frequency of the FM branch was 450 kHz, but according to the invention in the case of FIG. 3 the intermediate frequency signal IF2 is 2.4576 MHz. Here it has to be observed that the second intermediate frequency signal IF2 is used for the signal of both the FM system and the DSSS system, and therefore separate equipment is not required for the digital frequency conversion of the spread spectrum signal. The selectivity filter 8 in the FM branch should have a pass-band width of about 30 kHz.

In typical prior art solutions the FM signal is demodulated from the second intermediate frequency to a voiceband signal, which must be analog-to-digital converted for digital processing of the voiceband signal. The signal-to-noise ratio (SNR) of the input signal should be of the order 40 dB, in order to have a proper digital processing. This requires typically an 8-bit analog-to-digital converter with a sampling rate of about 8 kHz. Prior art solutions use for this purpose a specially manufactured analog-to-digital converter, since the spread spectrum converters used for this purpose are only 4-bit or 5-bit converters in order to keep an uncomplicated structure and a moderate power consumption despite the high sampling rate, as was mentioned above.

However, the use of a dedicated analog-to-digital converter means extra costs, and thus according to the invention the sampling of the FM signal is made by the same analog-to-digital converter 14, which also performs the analog-to-digital conversion of the spread spectrum signal. Thus the receiver requires only one analog-to-digital converter. The 5-bit A/D-converter used here provides inherently a signal-to-noise ratio of about 27 dB. However, now the voiceband signal is sampled at the frequency $f_S$=9.8304 MHz, which is 1228.8 times 8 kHz, i.e. the oversampling is 1228.8 times the sampling rate of a prior art dedicated converter. Now, by applying digital filtering and sampling rate decimation to the signal sampled in this way, the signal-to-noise ratio can be increased by 30 dB, i.e. the total signal-to-noise ratio in the FM-mode will be then 27+30=57 dB, which is higher than the above required SNR of 40 dB.

As a possible drawback of the first embodiment of the invention presented above we could consider that the FM-mode still requires an analog FM-demodulator, and that the operating frequency of the demodulator and the FM-mode filter is shifted to a "nonstandard" frequency. Moreover, the spread spectrum mode DSSS now requires a band-pass filter instead of two low-pass filters. In order to overcome this drawback the FM demodulation is made digitally in the second embodiment of the invention.

Figure 4:
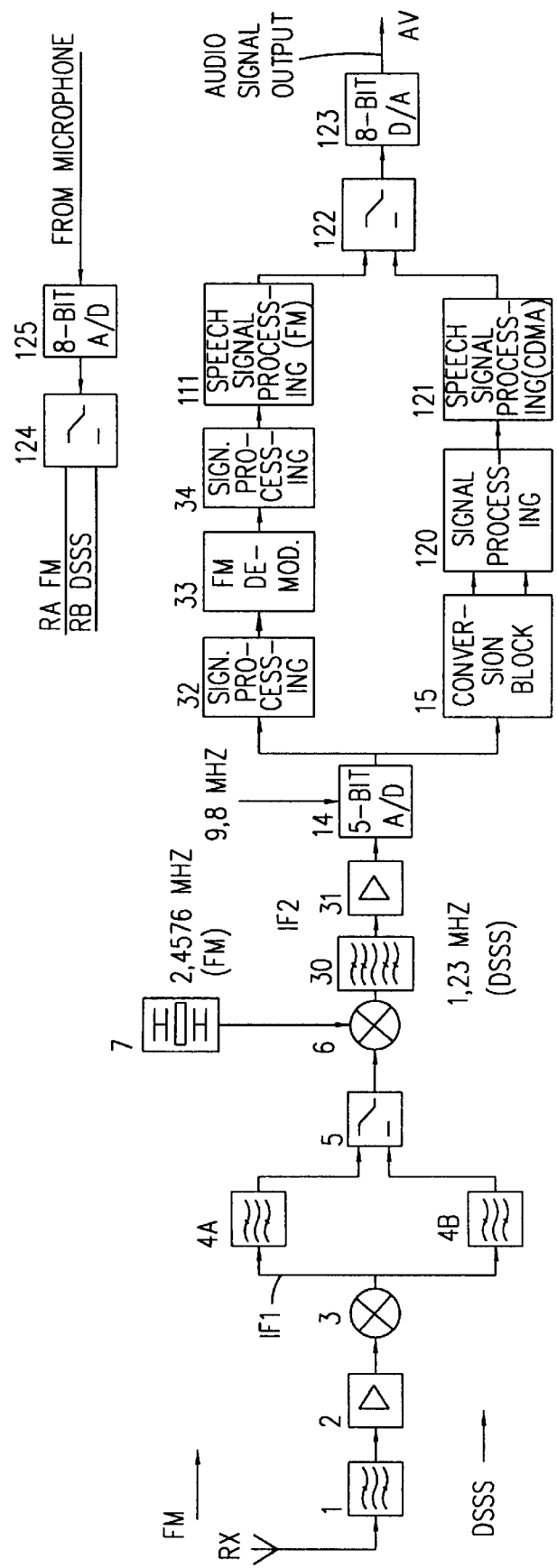
FIG. 4 shows in a block diagram a circuit arrangement according to the second embodiment of the invention for the reception of a spread spectrum signal and a frequency modulated signal.

FIG. 4 shows another embodiment of the invention. There the FM signal is sampled by a single 5-bit analog-to-digital converter 14 having a sampling rate of 9.8304 MHz in this example. The FM signal is then processed digitally in the block 32, and the sampled signal is downconverted to baseband by circuits of a similar type as for the spread spectrum signal. In this connection the signal is filtered, and possibly the number of samples is decimated. The FM signal is further supplied from the block 32 to an FM demodulator 33 having an output signal of 8-bit samples at a frequency of 8 kHz in this example of FIG. 4. The output signal of the FM demodulator is supplied via the signal processing block 34 to the FM-mode speech signal processing block 111, as was described above with reference to FIGS. 1 and 2.

In the case of FIG. 4 the block 32 realizing the digital filtering of the FM signal can now perform the selectivity filtering, which in the former example had to be made by an intermediate frequency filter. Thus the requirements on the intermediate frequency filter can be significantly reduced. In fact, the intermediate frequency would not require any separate filtering 30 at all for the FM signal, but in this case the filter 30 required for the spread spectrum signal is also used for the FM signal.

The digital filtering in the blocks 32 to 34 of FIG. 4 reduces the quantization noise of the 5-bit analog-to-digital converter 14 by as much as 24 dB due to the 327-fold oversampling ratio (or 9.8304 MHz/0.03 MHz=327.68).

The second embodiment of the invention presented in FIG. 4 has one drawback in that the FM-mode receiver has to be linear. A linear arrangement requires more power than other corresponding arrangements, and a linear receiver must also be equipped with automatic gain control (AGC) in order to provide a sufficient dynamic range (not shown in FIG. 4). The AGC circuits as such are already present for the spread spectrum reception, and they can readily be used also for the FM receiver, so that this point will not present any problem in a dual-mode receiver.

Regarding the operation of the spread spectrum receiver in the example of FIG. 4 the selectivity of the intermediate frequency filter 30 has to be about half of the total required selectivity of a spread spectrum receiver. In the case of the filter 11 in FIG. 2 it would be 30 kHz, for example. In order to reduce the requirements on the selectivity a spread spectrum receiver can use a digital selectivity filter according to the invention, FIG. 5.

Figure 5:
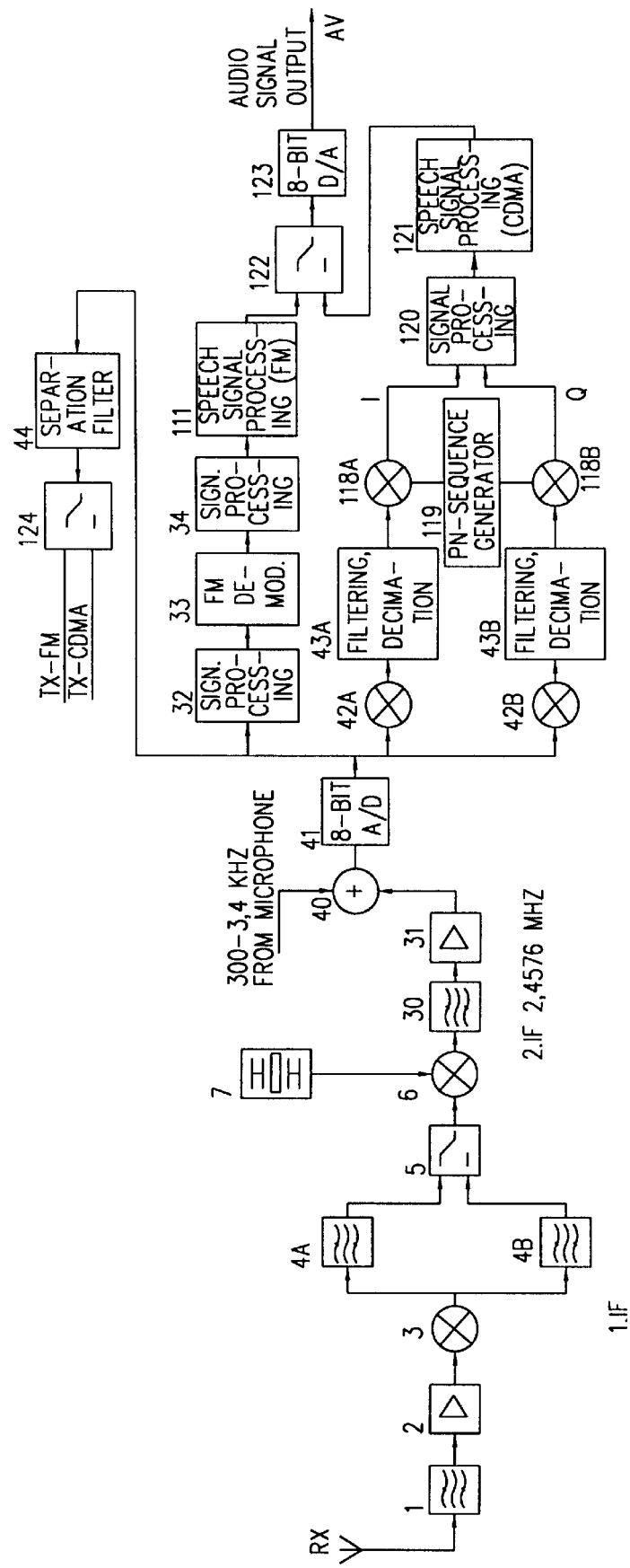
FIG. 5 shows in a block diagram a circuit arrangement according to the third embodiment of the invention for the reception of a spread spectrum signal and a frequency modulated signal.

In the embodiment shown in FIG. 5 the received signal is supplied through the blocks 1 to 6 in the same way as explained above, for instance in connection with FIG. 2. Here the requirements on the filter 30 for the second intermediate frequency 2.4567 MHz are reduced. Then the output signal of the filter 30 has a wider dynamic range than in the previous examples, and thus the number of bits must be increased in the following analog-to-digital converter 41. Inevitably this leads to a more complex structure of the analog-to-digital converter. On the other hand, the increased number of bits can be utilized in another way; firstly, the increased number of bits provides a wider dynamic range for the FM-mode signal, and secondly, according to the invention the same analog-to-digital converter can now also be used for processing the speech signal.

In FIG. 5 the speech signal from the microphone is now supplied via the signal adding circuit 40 to the same analog-to-digital converter 41 as the intermediate frequency signal. Then the analog-to-digital converter 125 shown in FIGS. 1, 2 and 4 can be omitted, and the total number of the transmitter/receiver components can be reduced. This solution according to the invention is possible, because both the spread spectrum signal (DSSS) and the FM signal (FM) are on the intermediate frequency when they are supplied to the analog-to-digital converter 41. Thus the signals at the input of the analog-to-digital converter 41 are on different frequency bands, and they are added in analog form in the adder 40, and only then the sum is analog-to-digital converted. After the analog-to-digital conversion the speech signal can be separated from the received FM/DSSS signal by simple digital filtering methods known per se. The received FM-mode signal is filtered and processed in the blocks 32 to 34, 111, as in the previous examples. The speech signal is filtered with the digital filter 44 and supplied via the switch 124 to the respective transmission branch, either to the FM-mode or to the spread spectrum mode transmission branch. The complex digital DSSS signal is processed in the above described way in the I, Q branches, which perform digital frequency conversion 42a, 42b, digital filtering and reduction of the number of samples 43a, 43b. Finally there is processing with the PN sequence in the multiplicators 118a, 118b, the signal processing 120 and the CDMA-mode processing of the speech signal, as was described in connection with FIG. 1.

The speech signal has typically a dynamic range of approximately 70 dB, which normally would require a 13-bit analog-to-digital converter when operating at a sampling frequency of 8 kHz. However, in the solution according to the invention shown in FIG. 5, the sampling is made at a high frequency 9.8304 MHz, and thus the oversampling is 1229 (9.8304 MHz/0.008 MHz), which reduces the quantization noise by more than 30 dB. In order to guarantee a sufficient dynamic range for the speech signal the analog-to-digital converter 41 requires sampling with only at least 8 bits, as shown in FIG. 5.

Digital filtering is required to separate the signals from the analog-to-digital converted sum signal, as in FIG. 5, but this does not cause extra costs concerning the FM signal or the DSSS signal, since digital filtering is required in any case for the selectivity filtering. Concerning the FM signal the digital filter 32 also reduces the quantization noise. Concerning the speech signal the separation filter 44 for the digital signal also performs quantization noise filtering.

Realization of the above presented embodiments are not presented at a detailed circuit design level, because the above presented blocks can be realized with generally available components in a way well known to a person skilled in the art.

Above we presented only a few applications of the method according to the invention. The method according to the invention can of course be modified within the scope of the claims, for instance regarding the detailed realization and application areas. Particularly, numerous combinations of the above presented embodiments are possible within the inventive idea.

What is claimed is:

1. A method for processing a received spread spectrum signal and a received frequency modulated signal, in which:

a radio frequency signal is received (1, 2), the received radio frequency signal being either a spread spectrum signal or a frequency modulated signal, the received signal is converted into an intermediate frequency signal (3, 1. IF), an intermediate frequency signal processing is performed (4a, 4b) to provide processed intermediate frequency signals, comprising the following steps, namely:

a frequency modulated intermediate frequency signal is formed by use of a first band-pass filter (4a), and spread spectrum intermediate frequency signal is formed by use of a second band-pass filter (4b), with respect to the derived signals, either a signal derived from the received spread spectrum signal or the signal derived from the received frequency modulated signal, respectively, is selected by switching means (5), and the signal selected by said switching means, or a signal derived from it, is converted into a second intermediate frequency signal (2. IF) by use of converting means (6, 7), a speech signal is added to said first intermediate signal or to said second intermediate signal in order to form a sum signal by use of adding means (40), a sampled signal from said sum signal is formed by use of sampling means (41), the sampled intermediate frequency signals are converted into baseband signals, comprising the following steps, namely the spread spectrum signal or the frequency modulated signal is converted into a baseband signal by use of converting means (32, 42a, 42b), the spread spectrum signal is digitally filtered by filtering means (43a, 43b), the spread spectrum of the filtered spread spectrum signal is despread by use of despreading means (118a, 118b, 119), the frequency modulated signal is digitally demodulated by use of demodulating means (33), and the sampled signal is filtered by use of filter means (44) in order to separate the speech signal from the intermediate frequency signal.

2. A method for processing a received spread spectrum signal and a received frequency modulated signal, in which:

a radio frequency signal is received (1, 2), the received radio frequency signal being either a spread spectrum signal or a frequency modulated signal, the received signal is converted into an intermediate frequency signal (3, 1. IF), an intermediate frequency signal processing is performed (4a, 4b) to provide processed intermediate frequency signals, comprising the following steps, namely:

a frequency modulated intermediate frequency signal is formed by use of a first band-pass filter (4a), and spread spectrum intermediate frequency signal is formed by use of a second band-pass filter (4b), with respect to the derived signals, either a signal derived from the received spread spectrum signal or the signal derived from the received frequency modulated signal, respectively, is selected by switching means (5), the signal selected by said switching means, or a signal derived from it, is converted into a second intermediate frequency signal (2. IF) by use of converting means (6, 7), the frequency modulated second intermediate frequency signal is demodulated by demodulating means (10), with respect to the signals derived from the second intermediate frequency signals, either a signal derived from the received spread spectrum signal or the signal derived from the received frequency modulated signal, respectively, is selected by switching means (5), a speech signal is added to said first intermediate signal or to said second intermediate signal in order to form a sum signal by use of adding means, a sampled signal from said sum signal is formed by use of sampling means (14), the sampled intermediate frequency signals are converted into baseband signals, comprising the following steps, namely the spread spectrum signal is converted into a baseband signal by use of converting means, the spread spectrum signal is digitally filtered by filtering means, the spread spectrum of the filtered spread spectrum signal is despread by use of despreading means, and the sampled signal is filtered by use of filter means in order to separate the speech signal from the intermediate frequency signal.

3. A circuit arrangement for processing a received spread spectrum signal and a received frequency modulated signal, the circuit arrangement comprising:

means (1, 2, 3) to receive radio frequency signals, and including first conversion means (3) to convert the received signals into intermediate frequency signals, first processing means (4a, 4b, 6, 7, 30, 31) to process the intermediate frequency signals to provide processed intermediate frequency signals, comprising:

a first band-pass filter (4a) to form a frequency modulated intermediate frequency signal, and a second band-pass filter (4b) to form a spread spectrum intermediate frequency signal, first switching means (5), which is connected to output terminals of said first and said second band-pass filters for selecting either said frequency modulated intermediate frequency signal or said spread spectrum intermediate frequency signal, and second conversion means (6, 7) to convert the signal selected by said switching means, or a signal derived from it, into a second intermediate frequency signal, said circuit arrangement further comprises sampling means (14) to convert the second intermediate frequency signal into a digital sampled signal, wherein said sampling means (14) have a sampling frequency, which is four times the intermediate frequency of said second intermediate frequency signal (IF2), the sampling frequency of said sampling means is a multiple of a symbol frequency of the spread spectrum signal, and said multiple is eight, third conversion means (33, 15) to convert the sampled intermediate frequency signals into baseband signals, wherein said third conversion means further comprises means (33) to digitally demodulate the frequency modulated signal, and wherein said third conversion means further comprises despread means to convert the sampled intermediate frequency spread spectrum signal into a despread baseband signal, the despread means comprising:

means (16, 20) to select two consecutive samples out of eight samples input from said sampling means (14), means (26) to add a first sample (I1) of said consecutive samples into a first register (26) or to subtract the first sample from the first register, based on a first PN sequence (PN I), means (23) to invert a second PN sequence (PN Q), means (21, 23, 24, 26) to add the second sample (Q1) of said two consecutive samples into the first register (26) or to subtract the second sample from the first register, based on an inverted bit contained in the second PN sequence (PN Q), means (22, 25, 28) to add the first sample (I1) into a second register (28) or to subtract the first sample from the second register, based on the second PN sequence (PN Q), and means (22, 25, 28) to add the second sample (Q1) into the second register (28) or to subtract the second sample from the second register, based on a bit contained in the first PN sequence (PN I).

4. The use of the circuit arrangement according to claim 3, in an AMPS system, and wherein the digital-to-analog converter is operated at a sampling speed and a number of bits of resolution to enable use of the analog-to-digital converter for both of the spread spectrum signal and the frequency modulated signal.

5. A circuit arrangement for processing a received spread spectrum signal and a received frequency modulated signal, the circuit arrangement comprising:

means to receive radio frequency signals, and including first conversion means to convert the received signals into intermediate frequency signals, first processing means to process the intermediate frequency signals to provide processed intermediate frequency signals, comprising:

a first band-pass filter to form a frequency modulated intermediate frequency signal, and a second band-pass filter to form a spread spectrum intermediate frequency signal, first switching means, which is connected to output terminals of said first and said second band-pass filters for selecting either said frequency modulated intermediate frequency signal or said spread spectrum intermediate frequency signal, second conversion means to convert the signal selected by said switching means, or a signal derived from it, into a second intermediate frequency signal, means to demodulate the frequency modulated signal, said circuit arrangement further comprises second switching means for selecting either the frequency modulated intermediate frequency signal or the spread spectrum intermediate frequency signal, sampling means connected to an output terminal of said second switching means to sample the selected signal, wherein said sampling means have a sampling frequency, which is four times the intermediate frequency of said second intermediate frequency signal, the sampling frequency of said sampling means is a multiple of a symbol frequency of the spread spectrum signal, and said multiple is eight, third conversion means to convert the spread spectrum signal sampled intermediate frequency signals into baseband signals, despread means to convert the sampled intermediate frequency spread spectrum signal into a despread baseband signal, the despread means comprising:

means to select two consecutive samples out of eight samples input from said sampling means, means to add a first sample of said consecutive samples into a first register or to subtract the first sample from the first register, based on a first PN sequence, means to invert a second PN sequence, means to add the second sample of said two consecutive samples into the first register or to subtract the second sample from the first register, based on an inverted bit contained in the second PN sequence, means to add the first sample into a second register or to subtract the first sample from the second register, based on the second PN sequence, and means to add the second sample into the second register or to subtract the second sample from the second register, based on a bit contained in the first PN sequence.

6. The use of the circuit arrangement according to claim 5 in an AMPS system, and wherein the digital-to-analog converter is operated at a sampling speed and a number of bits of resolution to enable use of the analog-to-digital converter for both of the spread spectrum signal and the frequency modulated signal.

7. A circuit arrangement for processing a received spread spectrum signal and a received frequency modulated signal, the circuit arrangement comprising:

means to receive radio frequency signals, and including first conversion means to convert the received signals into intermediate frequency signals, first processing means to process the intermediate frequency signals to provide processed intermediate frequency signals, comprising:

a first band-pass filter to form a frequency modulated intermediate frequency signal, and a second band-pass filter to form a spread spectrum intermediate frequency signal, first switching means, which is connected to output terminals of said first and said second band-pass filters for selecting either said frequency modulated intermediate frequency signal or said spread spectrum intermediate frequency signal, and second conversion means to convert the signal selected by said switching means, or a signal derived from it, into a second intermediate frequency signal, said circuit arrangement further comprises means to add a speech signal to said first intermediate frequency signal or to said second intermediate frequency signal in order to form a sum signal, sampling means to convert the second intermediate frequency signal into a digital sampled signal, wherein said sampling means is operative to form a sampled signal from said sum signal, third conversion means to convert the sampled intermediate frequency signals into baseband signals, wherein said third conversion comprises means to digitally filter the spread spectrum signal, means to despread the spread spectrum of the filtered spread spectrum signal, means to digitally demodulate the frequency modulated signal, and means to filter the sampled signal in order to separate the speech signal from the intermediate frequency signal.

8. A circuit arrangement according to claim 7, wherein said sampling means have a sampling frequency, which is four times the intermediate frequency of said second intermediate frequency signal, the sampling frequency of said sampling means is a multiple of a symbol frequency of the spread spectrum signal.

9. A circuit arrangement according to claim 8, wherein said multiple is eight.

10. A circuit arrangement for processing a received spread spectrum signal and a received frequency modulated signal, the circuit arrangement comprising:

means to receive radio frequency signals, and including first conversion means to convert the received signals into intermediate frequency signals, first processing means to process the intermediate frequency signals to provide processed intermediate frequency signals, comprising:

a first band-pass filter to form a frequency modulated intermediate frequency signal, and a second band-pass filter to form a spread spectrum intermediate frequency signal, first switching means, which is connected to output terminals of said first and said second band-pass filters for selecting either said frequency modulated intermediate frequency signal or said spread spectrum intermediate frequency signal, and second conversion means to convert the signal selected by said switching means, or a signal derived from it, into a second intermediate frequency signal, means (10) to demodulate the frequency modulated signal, said circuit arrangement further comprises second switching means (13) for selecting either the frequency modulated intermediate frequency signal or the spread spectrum intermediate frequency signal, means to add a speech signal to said first intermediate frequency signal or to said second intermediate frequency signal in order to form a sum signal, sampling means connected to an output terminal of said second switching means to sample the selected signal, wherein said sampling means is operative to form a sampled signal from said sum signal, third conversion means to convert the sampled intermediate frequency signals into baseband signals, wherein said third conversion means comprises means to digitally filter the spread spectrum signal, means to despread the spread spectrum of the filtered spread spectrum signal, and means to filter the sampled signal in order to separate the speech signal from the intermediate frequency signal.

11. A circuit arrangement according to claim 10, wherein said sampling means have a sampling frequency, which is four times the intermediate frequency of said second intermediate frequency signal, and the sampling frequency of said sampling means is a multiple of a symbol frequency of the spread spectrum signal.

* * * * *